(12) United States Patent
Eno

(10) Patent No.: US 10,317,227 B2
(45) Date of Patent: Jun. 11, 2019

(54) ROUTING TO LOCATIONS WITH MULTIPLE ENTRANCES

(71) Applicant: Verizon Patent and Licensing Inc., Basking Ridge, NJ (US)

(72) Inventor: Joshua D. Eno, Denver, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/806,051

(22) Filed: Nov. 7, 2017

(65) Prior Publication Data
US 2019/0137292 A1    May 9, 2019

(51) Int. Cl.
*G01C 21/34*    (2006.01)
*G01C 21/36*    (2006.01)

(52) U.S. Cl.
CPC ..... *G01C 21/3461* (2013.01); *G01C 21/3484* (2013.01); *G01C 21/362* (2013.01); *G01C 21/3617* (2013.01)

(58) Field of Classification Search
CPC ............ G01C 21/3484; G01C 21/3461; G01C 21/3617; G01C 21/362; G01C 21/005
See application file for complete search history.

(56) References Cited

U.S. PATENT DOCUMENTS

| | | | |
|---|---|---|---|
| 8,816,880 B1* | 8/2014 | Foster | G08G 1/146 340/932.2 |
| 2007/0112510 A1* | 5/2007 | Ogawa | G01C 21/3605 701/438 |
| 2007/0118278 A1* | 5/2007 | Finn | G06F 17/30241 701/438 |
| 2010/0222996 A1* | 9/2010 | Weiland | G01C 21/20 701/532 |
| 2011/0191019 A1* | 8/2011 | Holsinger | G01C 21/00 701/533 |
| 2017/0139926 A1* | 5/2017 | Baig | G06F 3/04817 |

* cited by examiner

*Primary Examiner* — Michael J Zanelli (57) ABSTRACT

A device can obtain geographic map metadata associated with a set of locations. The device can generate a data structure that associates the geographic map metadata for each location, of the set of locations. The device can receive, from a user device, a request for a set of navigational directions to a first location with multiple entrances, where the first location is one of the set of locations. The request can include information identifying the first location and information identifying a current location of the user device. The device can select an entrance, of the multiple entrances associated with the first location based on the request. The device can determine the set of navigational directions using geographic map metadata associated with the first location. The device can provide the set of navigational directions to the user device to direct the user device to the selected entrance.

20 Claims, 7 Drawing Sheets

ROUTING TO LOCATIONS WITH MULTIPLE ENTRANCES

BACKGROUND

A navigation system can utilize geographic map data to identify a path for a user. For example, a navigation service can receive, from a user device, a request for navigational directions to a particular geographic location, and can use pathing algorithms and geographic map data to identify a path for the user device.

DETAILED DESCRIPTION OF PREFERRED EMBODIMENTS

The following detailed description of example implementations refers to the accompanying drawings. The same reference numbers in different drawings can identify the same or similar elements.

Geographic map data can be used to make vehicle navigation decisions. For example, a user device can provide, to a navigation service, a request for a set of navigational directions to a particular location (e.g., an airport, a mall, a restaurant, etc.). In this case, the navigation service can use routing techniques and geographic map data to identify and direct the user device to the particular location or to a set of geographic coordinates near the particular location.

However, limited geographic map data relating to the particular location can cause the navigation service to provide a set of navigational directions that is inefficient or that takes the user device to a non-preferred entrance of the particular location. For example, if a user interacts with a user device to request a set of navigational directions to a mall that has six entrances, the navigation service might direct the user device to a particular entrance that is not the entrance preferred by the user.

Some implementations described herein describe a navigation platform that provides a user device with a set of navigational directions to a preferred entrance associated with a location that has multiple entrances. For example, the navigation platform can receive, from a user device, a request for a set of navigational directions to a location that has multiple entrances. In this case, the navigation platform can select an entrance, of the multiple entrances, by analyzing location information and/or user preferences included in the request. In some cases, user preferences might not be provided via the request, but rather can be stored using a data structure as part of a user profile that is accessible by the navigation platform. Furthermore, the navigation platform can determine the set of navigational directions using geographic map metadata associated with the location. Additionally, the navigation platform can provide the set of navigational directions to the user device to direct the user device to the selected entrance.

In this way, the navigation platform provides the user device with navigational directions to a preferred entrance, despite that the location has multiple entrances. Furthermore, the navigation platform conserves processing resources and/or network resources that might otherwise be used to re-compute navigational directions for the user device. For example, if the navigation platform determines a set of navigational directions without the methods described herein, a user device might be routed to a non-preferred entrance, which might cause the user device to re-request navigational directions in hopes of being routed to a preferred entrance.

FIGS. 1A-1D are diagrams of an overview of an example implementation 100 described herein. As shown in FIGS. 1A-1D, example implementation 100 shows a navigation platform providing a set of navigational directions to a user device, where the set of navigational directions direct the user device to a particular entrance associated with a shopping mall.

Figure 1A:
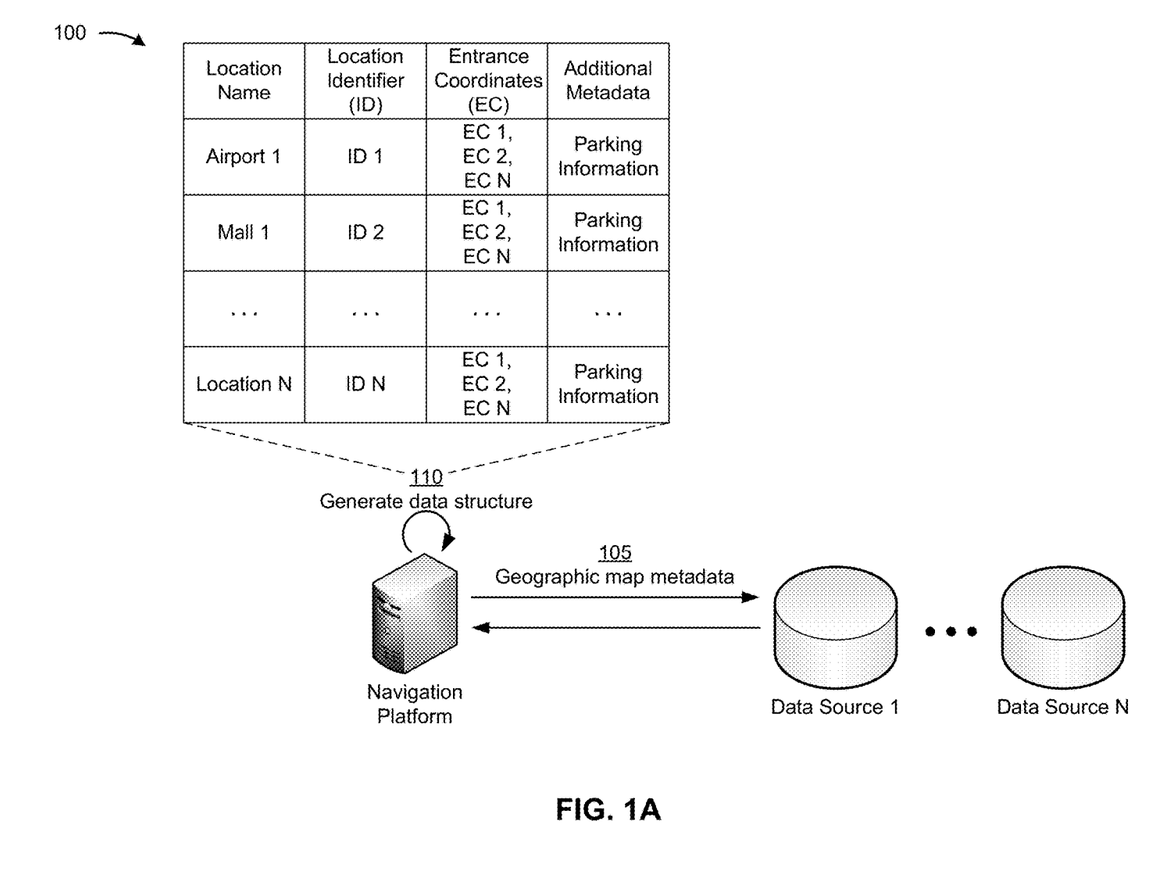
FIGS. 1A-1D are diagrams of an overview of an example implementation described herein.

As shown in FIG. 1A, and by reference number 105, the navigation platform can obtain geographic map metadata from one or more data sources (e.g., shown as data source 1 through data source N). The geographic map metadata can include metadata for a set of locations (e.g., an airport, a mall, a library, a restaurant, a business, a park, a stadium, etc.), and can include, for each location, metadata identifying a location (e.g., a location name, a location identifier, etc.), metadata identifying multiple entrances (e.g., geographic coordinates associated with each entrance), additional metadata (e.g., parking information for a location, etc.), and/or the like.

In some implementations, the navigation platform can obtain geographic map metadata from a data source. For example, the data source can store the geographic map metadata, and the navigation platform can search (e.g., query) the data source to identify the geographic map metadata. In some cases, the data source might store address information and/or geographic coordinates for each location, but might not store metadata identifying multiple entrances for each location. In this case, the navigation platform can use a data mining technique to analyze webpages associated with each location to identify the multiple entrances.

As an example, a webpage for a mall can include information identifying multiple entrances for the mall. For example, the webpage can include text identifying entrances of the mall and/or can include links (e.g., hyperlinks) to street-level maps that show the entrances. In this case, the navigation platform can use a data mining technique to analyze the webpage to identify the text identifying the entrances. Additionally, or alternatively, the navigation platform can analyze the street-level maps to identify the entrances.

In some implementations, the navigation platform can obtain additional metadata, such as parking information. For example, a data source can store the parking information, and the navigation platform can search the data source to obtain the parking information. The parking information can identify total parking spaces and/or available parking spaces in a particular parking lot or parking structure. Additionally, or alternatively, the navigation platform can obtain the additional metadata from sensors located at one or more locations, of the set of locations, as described further herein.

As shown by reference number 110, the navigation platform can generate a data structure that associates geographic map metadata for each location, of the set of locations. For example, as shown, the data structure can associate, for each location, of the set of locations, a location name (shown as airport 1, mall 1, location N), a location identifier (shown as ID 1 through ID N), geographic coordinates associated with multiple entrances (shown as EC 1 through EC N for each location), additional metadata (shown as parking information), and/or the like.

In this way, the navigation platform is able to generate a data structure that associates geographic map metadata for the set of locations.

Figure 1B:
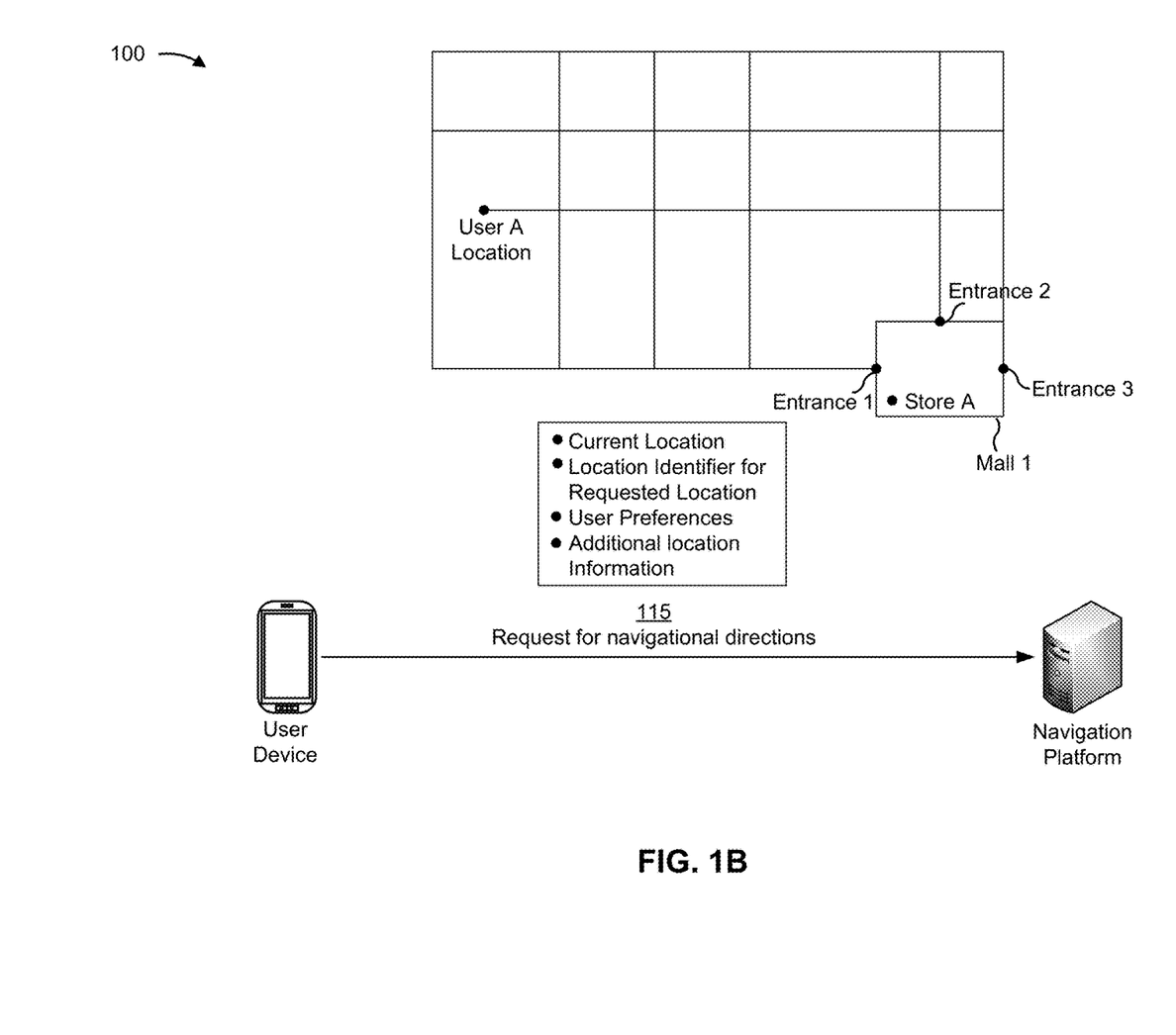

As shown in FIG. 1B, and by reference number 115, the navigation platform can receive a request for a set of navigational directions. For example, the request can include a current location of the user device, a location identifier that is associated with a requested location (e.g., a location name or a location address), one or more user preferences, additional location information, and/or the like. The one or more user preferences can include routing preferences (e.g., to select a most fuel-efficient route, a fastest-available route, a safest route, such as a route that avoids highways or heavy traffic, etc.), parking preferences (e.g., to park in a covered parking garage, to park outside, etc.), and/or the like. The additional location information can identify a particular geographic location within a location (e.g., a particular terminal at an airport, a particular store within a mall, etc.).

Shown as an example, user A can interact with the user device to request a set of navigational directions to mall 1. In this case, the request can include a current location of the user device, the location identifier for the requested location, such as an address of mall 1 or a name identifying mall 1, and one or more user preferences, such as a routing preference to select a fastest-available route, additional location information, such as a particular geographic location within mall 1 (shown as store A), and/or the like.

In this way, the navigation platform is able to receive a request for a set of navigational directions.

Figure 1C:
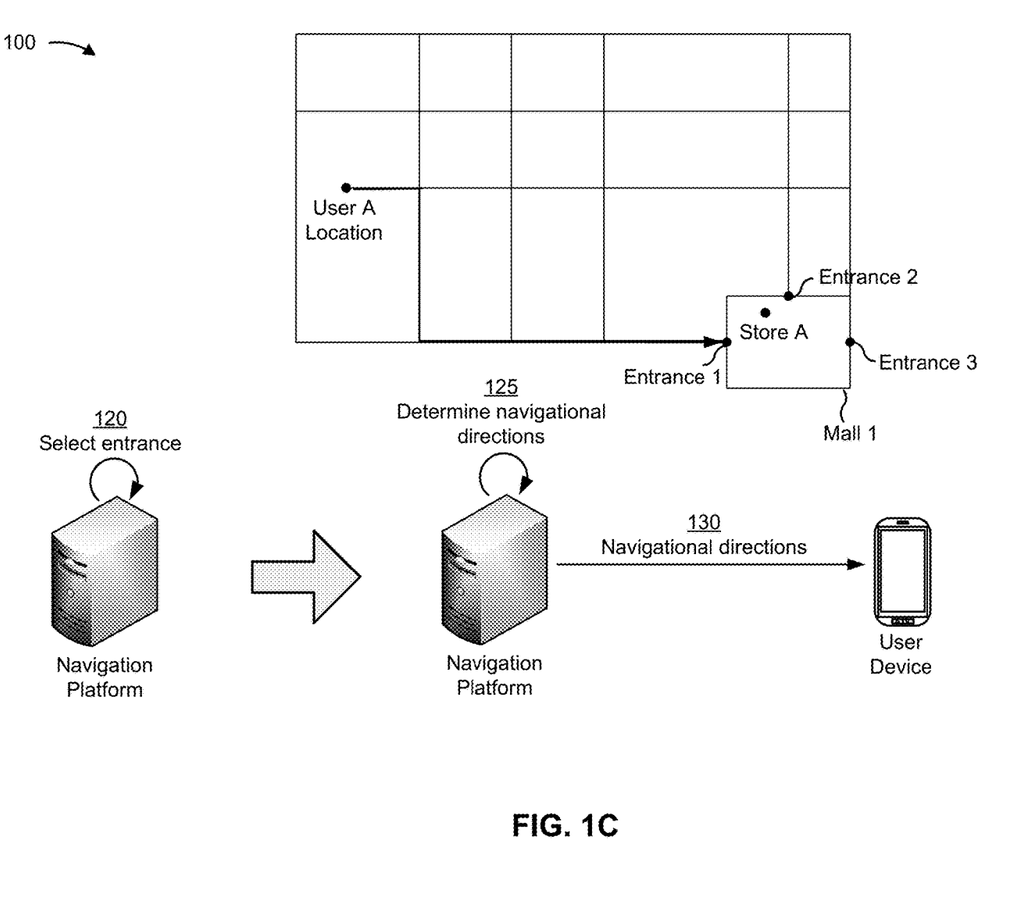

As shown in FIG. 1C, and by reference number 120, the navigation platform can select an entrance to use as a destination for the set of navigational directions. For example, the navigation platform can use a location identifier included in the request to search the data structure to identify multiple entrances associated with the location identifier. In this case, the navigation platform can select an entrance, of the multiple entrances, using the current location of the user device, the one or more user preferences, the additional metadata (e.g., which can include the parking information, the additional location information, etc.), and/or the like. In some cases, the navigation platform can execute a ranking technique to rank the entrances, and can select a ranking with a highest score.

As an example, the request for the set of navigational directions can include a location identifier for Mall 1, and the navigation platform can use the location identifier to search the data structure to identify entrance 1, entrance 2, and entrance 3 as entrances associated with Mall 1. If the request includes additional location information indicating that user A is going to visit store A within Mall 1, and store A is located closest to entrance 2, then the navigation platform can select entrance 2 as the entrance to use as a destination location for the set of navigational directions. Additionally, if the parking information indicates that there is no available parking near entrance 2, then the navigation platform can select a nearest available entrance (e.g., entrance 1) as the destination location for the set of navigational directions.

As shown by reference number 125, the navigation platform can determine the set of navigational directions. For example, the navigation platform can utilize a routing technique and/or the one or more user preferences to determine a set of navigational directions to the selected entrance. As an example, assume the navigation platform selects entrance 1 and that user preferences include a preference to take the fastest-available route. In this case, the navigation platform can determine the set of navigational directions to entrance 1 using the fastest-available route (shown by the arrow between user A location and entrance 1).

As shown by reference number 130, the navigation platform can provide the set of navigational directions to the user device. For example, the navigation platform can provide the set of navigational directions to the user device to direct the user device to entrance 1.

In this way, the navigation platform is able to provide the user device with the set of navigational directions to the selected entrance.

Figure 1D:
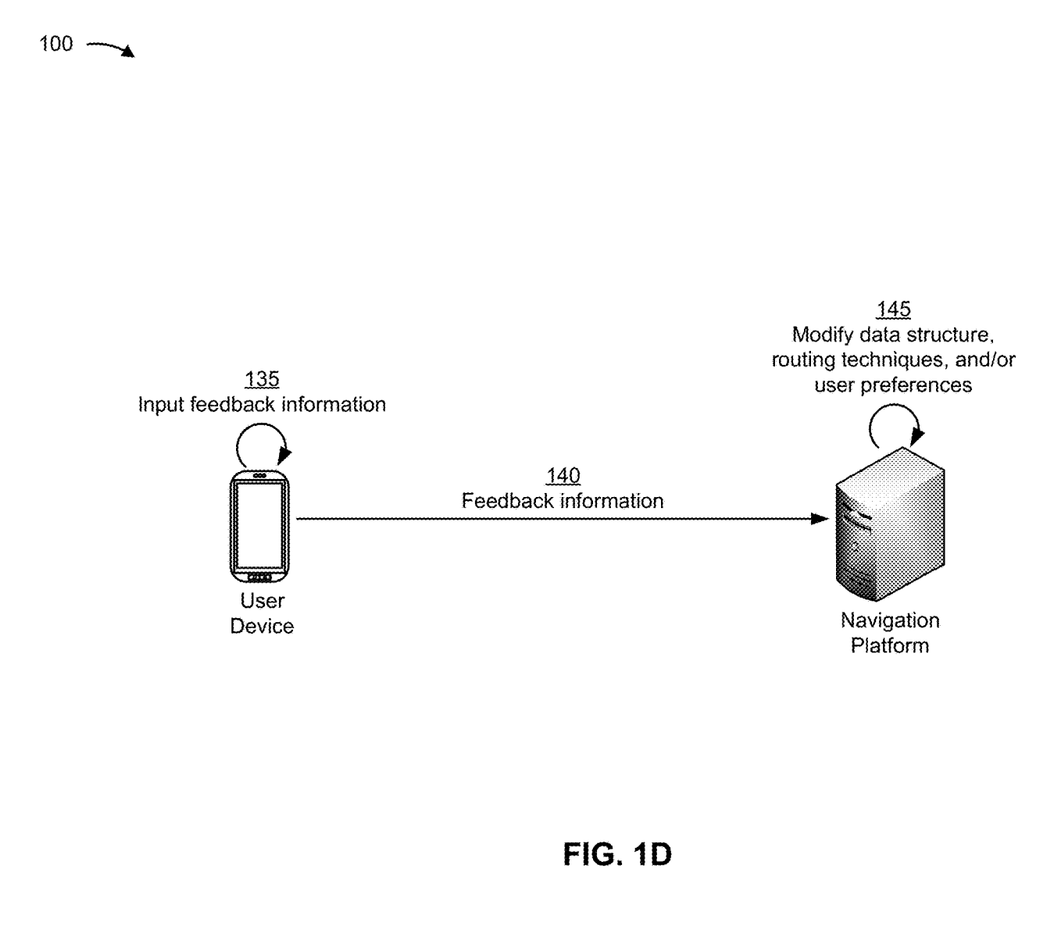

As shown in FIG. 1D, and by reference number 135, a user can interact with the user device to provide feedback information. In some cases, the feedback information can include negative feedback. As an example, negative feedback can indicate that the selected entrance is not a preferred entrance, and can provide free-form text explaining why the selected entrance is not the preferred entrance. In other cases, the feedback information can include positive feedback, such as feedback indicating that the correct entrance was selected. As shown by reference number 140, the user device can provide the feedback information to the navigation platform.

As shown by reference number 145, the navigation platform can modify the data structure, the one or more routing techniques, and/or the one or more user preferences based on the feedback information. In some implementations, the navigation platform can modify the data structure. For example, assume the data structure stores an indicator identifying a particular entrance as a default entrance for a location (e.g., a main entrance to a mall). In this case, if a threshold number of users provide feedback indicating that the default entrance is incorrect or is not a preferred entrance, the navigation platform can modify the data structure such that the default entrance is changed based on the feedback information.

Additionally, or alternatively, the navigation platform can modify the one or more user preferences. For example, the feedback information can include negative feedback indicating that another entrance should have been selected. In this case, the navigation platform can update the one or more user preferences such that the other entrance is selected during subsequent requests by the user device for navigational directions to the same location. Additionally, or alternatively, the user can provide new preferences as part of the feedback information, and the navigation platform can modify the one or more user preferences to account for the new preferences.

Additionally, or alternatively, the navigation platform can modify one or more routing techniques. For example, a user can indicate that a route taken to the selected entrance is not a route that should have been taken based on a user routing preference. In this case, the navigation platform can modify one or more routing techniques, and can use the one or more modified routing techniques to service subsequent requests by the user device for navigational directions.

In this way, the navigation platform is able to use feedback information to improve accuracy of the set of navigational directions to ensure that the user device is routed to a preferred entrance. Furthermore, the navigation platform conserves processing resources and/or network resources relative to a navigation service that is unable to identify a preferred entrance associated with a location. For example, if a navigation service determines a set of navigational directions without the methods described herein, a user device might be routed to a non-preferred entrance. In this case, the user device might re-request navigational directions in hopes of being routed to a preferred entrance, and the navigation service might spend additional processing resources and/or utilize additional network resources to re-determine navigational directions for the user device.

As indicated above, FIGS. 1A-1D are provided merely as an example. Other examples are possible and can differ from what was described with regard to FIGS. 1A-1D. For example, there can be additional devices and/or networks, fewer devices and/or networks, different devices and/or networks, or differently arranged devices and/or networks than those shown in FIGS. 1A-1D. Furthermore, two or more devices shown in FIGS. 1A-1D can be implemented within a single device, or a single device shown in FIGS. 1A-1D can be implemented as multiple, distributed devices. Additionally, or alternatively, a set of devices (e.g., one or more devices) of environment 100 can perform one or more functions described as being performed by another set of devices of environment 100.

Figure 2:
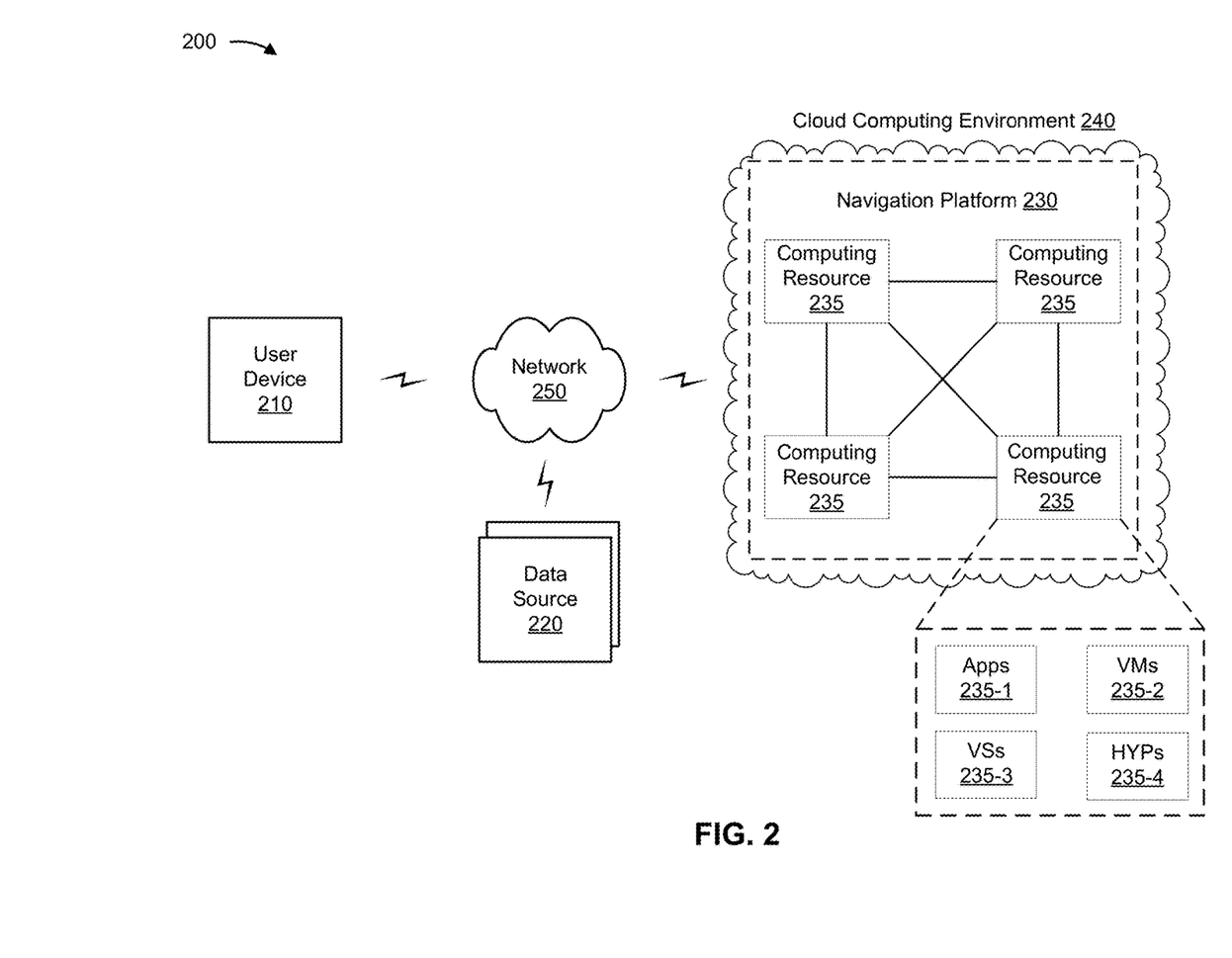
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 210, a data source 220, a navigation platform 230 hosted by a cloud computing environment 240, and/or a network 250. Devices of environment 200 can interconnect via wired connections, wireless connections, optical connections, or a combination of connections.

User device 210 includes one or more devices capable of receiving, generating, storing, processing, and/or providing information associated with navigational directions. For example, user device 210 can include a communication and/or computing device, such as a phone (e.g., a mobile phone, such as a smartphone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 can provide a request for a set of navigational directions to navigation platform 230. In some implementations, user device 210 can receive the set of navigational directions from navigation platform 230. In some implementations, user device 210 can provide feedback information to navigation platform 230.

Data source 220 includes one or more devices capable of receiving, generating, storing, processing, and/or providing geographic map metadata. For example, data source 220 can include a server device or a group of server devices. In some implementations, data source 220 can receive, from navigation platform 230, a request for geographic map metadata. In some implementations, data source 220 can provide the geographic map metadata to navigation platform 230. In some implementations, data source 220 can be configured to automatically provide the geographic map metadata to navigation platform 230.

In some implementations, one or more reporting devices can provide parking information and/or weather information to data source 220 and/or navigation platform 230. For example, the one or more reporting devices can include a sensor, such as, for example, a camera, a sensor located near a parking lot or near a particular location, a vehicle sensor, a sensor affixed to a drone, a weighting mechanism, such as an inductive loop capable of detecting the presence of a vehicle, a sensor capable of detecting weight or vehicle length, a pneumatic tube counting device, a sensor capable of performing weather readings, and/or the like. In some cases, the one or more reporting devices can obtain parking information and/or weather information, and can provide the parking information and/or the weather information to data source 220 and/or navigation platform 230.

Navigation platform 230 includes one or more devices capable of receiving, storing, generating, processing, and/or providing information associated with navigational directions. For example, navigation platform 230 can include a server device (e.g., a host server, a web server, an application server, etc.), a data center device, or a similar device.

In some implementations, as shown, navigation platform 230 can be hosted in cloud computing environment 240. Notably, while implementations described herein describe navigation platform 230 as being hosted in cloud computing environment 240, in some implementations, navigation platform 230 might not be cloud-based (i.e., can be implemented outside of a cloud computing environment) or might be partially cloud-based.

Cloud computing environment 240 includes an environment that hosts navigation platform 230. Cloud computing environment 240 can provide computation, software, data access, storage, and/or other services that do not require end-user knowledge of a physical location and configuration of system(s) and/or device(s) that host navigation platform 230. As shown, cloud computing environment 240 can include a group of computing resource 235 (referred to collectively as "computing resources 235 and individually as "computing resource 235").

Computing resource 235 includes one or more personal computers, workstation computers, server devices, or another type of computation and/or communication device. In some implementations, computing resource 235 can host navigation platform 230. The cloud resources can include compute instances executing in computing resource 235, storage devices provided in computing resource 235, data transfer devices provided by computing resource 235, etc. In some implementations, computing resource 235 can communicate with other computing resources 235 via wired connections, wireless connections, or a combination of wired and wireless connections.

As further shown in FIG. 2, computing resource 235 can include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that can be provided to or accessed by user device 210. Application 235-1 can eliminate a need to install and execute the software applications on user device 210. For example, application 235-1 can include software associated with navigation platform 230 and/or any other software capable of being provided via cloud computing environment 240. In some implementations, one application 235-1 can send/receive information to/from one or more other applications 235-1, via virtual machine 235-2.

Virtual machine 235-2 includes a software implementation of a machine (e.g., a computer) that executes programs like a physical machine. Virtual machine 235-2 can be either a system virtual machine or a process virtual machine, depending upon use and degree of correspondence to any real machine by virtual machine 235-2. A system virtual machine can provide a complete system platform that supports execution of a complete operating system ("OS"). A process virtual machine can execute a single program, and can support a single process. In some implementations, virtual machine 235-2 can execute on behalf of a user (e.g., user device 205), and can manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 can present a virtual operating platform to the guest operating systems, and can manage the execution of the guest operating systems. Multiple instances of a variety of operating systems can share virtualized hardware resources.

Network 250 includes one or more wired and/or wireless networks. For example, network 250 can include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
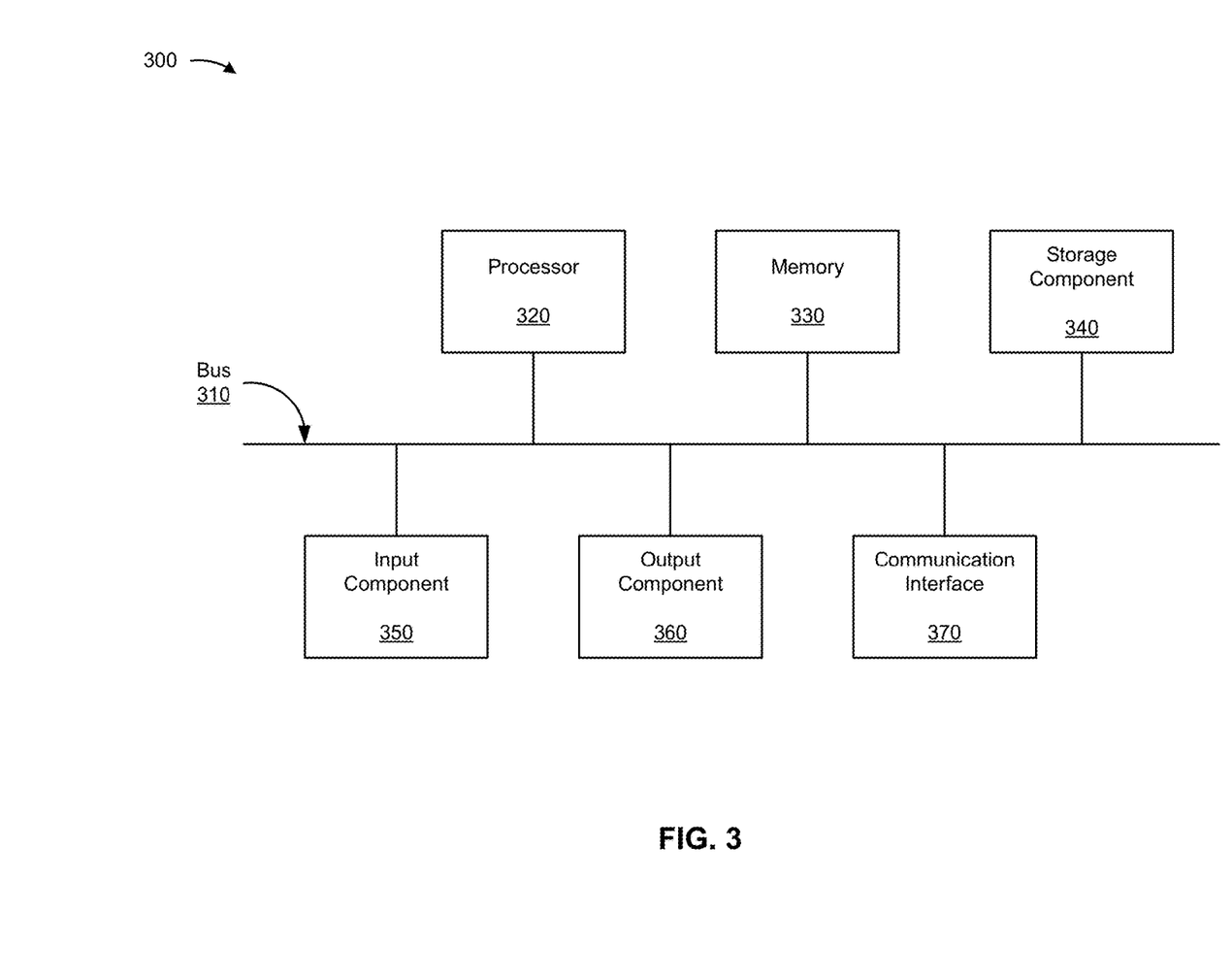
FIG. 3 is a diagram of example components of one or more devices of FIG. 2.

FIG. 3 is a diagram of example components of a device 300. Device 300 can correspond to user device 210, data source 220, and/or navigation platform 230. In some implementations, user device 210, data source 220, and/or navigation platform 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in location of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
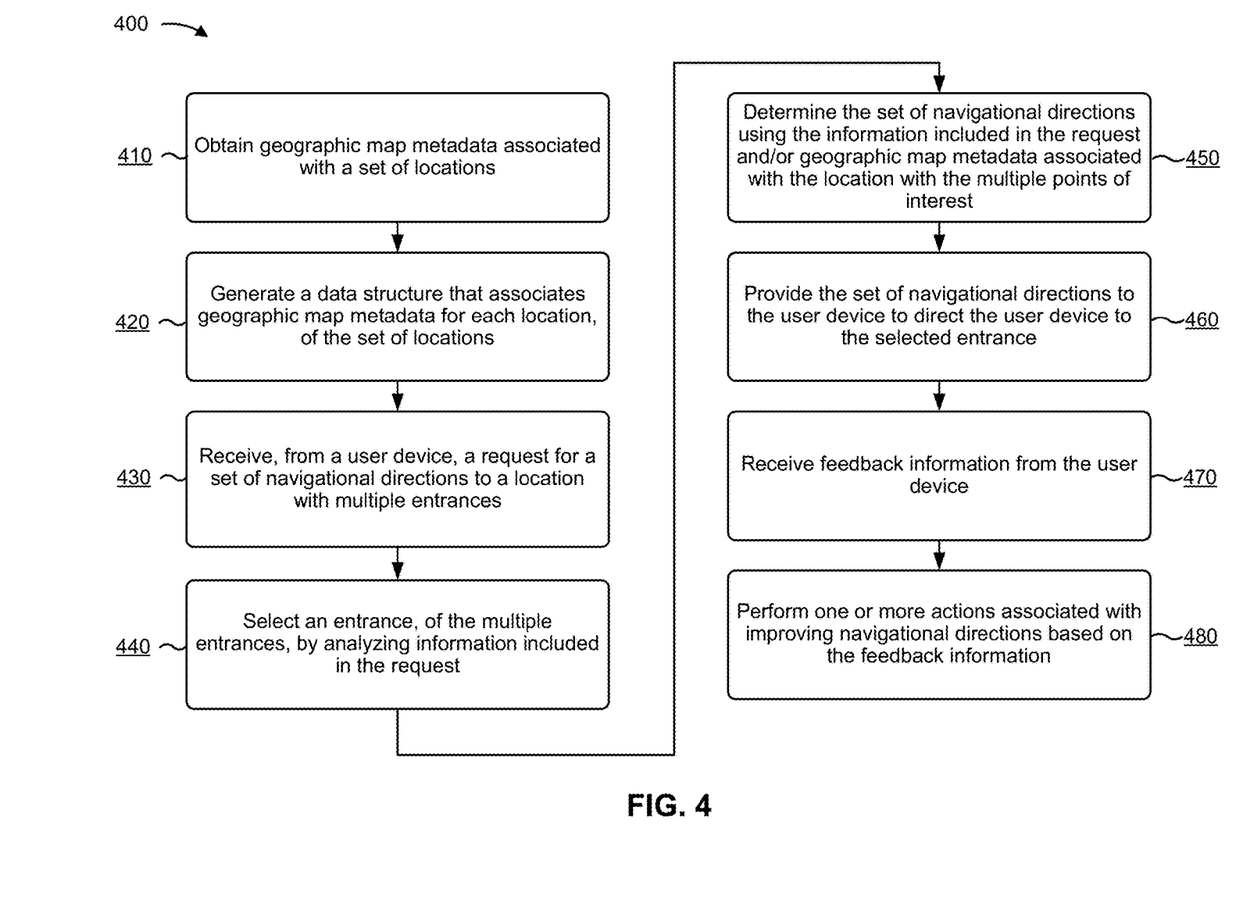
FIG. 4 is a flow chart of an example process for providing a user device with a set of navigational directions to a particular entrance associated with a location that has multiple entrances.

FIG. 4 is a flow chart of an example process 400 for providing a user device with a set of navigational directions to a particular entrance associated with a location that has multiple entrances. In some implementations, one or more process blocks of FIG. 4 can be performed by navigation platform 230. In some implementations, one or more process blocks of FIG. 4 can be performed by another device or a group of devices separate from or including navigation platform 230, such as user device 210 and/or data source 220.

As shown in FIG. 4, process 400 can include obtaining geographic map metadata associated with a set of locations (block 410). For example, navigation platform 230 can obtain, from data source 220, geographic map metadata associated with a set of locations by querying one or more data sources 220, by using a data mining technique to search one or more data sources 220, and/or the like. The geographic map metadata can include metadata for a set of locations (e.g., airports, malls, libraries, restaurants, businesses, etc.), and can include, for each location, metadata identifying a location (e.g., a location name, a location identifier, etc.), metadata identifying multiple entrances (e.g., geographic coordinates associated with each entrance, of the multiple entrances), additional metadata (e.g., parking information for a location), and/or the like.

In some implementations, navigation platform 230 can obtain geographic map metadata from data source 220. For example, data source 220 can store geographic map metadata, and navigation platform 230 can search (e.g., query) data source 220 to obtain the geographic map metadata. In some implementations, data source 220 can be configured to automatically provide the geographic map metadata to navigation platform 230.

In some implementations, navigation platform 230 can use a data mining technique to obtain geographic map metadata. For example, one or more locations, of the set of locations, might host a webpage that includes geographic map metadata. In this case, navigation platform 230 can use a data mining technique to analyze information included in the webpage to obtain the geographic map metadata.

As example, navigation platform 230 can obtain geographic map metadata by mining data from webpages associated with particular locations. In this case, navigation platform 230 can use a data mining technique to analyze webpages associated with locations to identify geographic map metadata associated with the locations. As a particular example, a website for an airport can include information indicating that the airport has a North terminal and a South terminal. In this case, navigation platform 230 can identify each terminal as an entrance.

As another example, navigation platform 230 can obtain geographic map metadata by analyzing heat maps. In this case, navigation platform 230 can access a data source 220 that uses a heat map to monitor user traffic, and can analyze the heat map to identify entrances. As a particular example, a webpage for a mall can utilize a heat map to track retail shoppers, and navigation platform 230 can analyze the heat map to identify entrances of the mall. For example, heat signatures might show that shoppers consistently enter and/or exit the mall at particular points, and navigation platform 230 can identify the particular points as entrances.

In some implementations, navigation platform 230 can obtain parking information. For example, a data source 220 can store parking information, and navigation platform 230 can query the data source 220 to obtain the parking information. Additionally, or alternatively, sensors located at one or more locations can be configured to obtain parking information and to provide the parking information to navigation platform 230. Additionally, or alternatively, heat maps, as described above, can be used to identify parking information for areas around a particular location.

In this way, navigation platform 230 is able to obtain geographic map data associated with a set of locations.

As further shown in FIG. 4, process 400 can include generating a data structure that associates geographic map metadata for each location, of the set of locations (block 420). For example, navigation platform 230 can generate a data structure that, for each location, of the set of locations, associates metadata identifying a location with metadata identifying multiple entrances associated with the location. Additionally, or alternatively, navigation platform 230 can use the data structure to associate the metadata identifying the location with the additional metadata (e.g., the parking information).

In some implementations, navigation platform 230 can generate a data structure. For example, navigation platform 230 can generate a data structure such as a graph, a table, a linked-list, an array, a hash table, a tree, a database, and/or the like. In this case, the data structure can, for each location, of the set of locations, associate metadata identifying a location, metadata identifying multiple entrances associated with the location, additional metadata associated with the location, and/or the like.

In this way, navigation platform 230 is able to associate the geographic map metadata for each location, of the set of locations, such that information stored by the data structure can be used to service requests for navigational directions.

As further shown in FIG. 4, process 400 can include receiving, from a user device, a request for a set of navigational directions to a location with multiple entrances (block 430). For example, navigation platform 230 can receive, from user device 210, a request for a set of navigational directions to a location with multiple entrances (e.g., a mall, an airport, a park, etc.).

The request can include a current location of user device 210, a location identifier that is associated with a location name or a location address, one or more user preferences, additional location information, and/or the like. The one or more user preferences can include routing preferences (e.g., to select a most fuel-efficient route, a fastest-available route, a safest route, such as a route that avoids highways or heavy traffic, etc.), parking preferences (e.g., to park in a covered parking garage, to park outside, etc.), and/or the like. The additional location information can identify a particular geographic location within a location (e.g., a particular terminal at an airport, a particular store within a mall, etc.). In some cases, user device 210 can display a prompt requesting the additional location information as inputting the initial request. In other cases, navigation platform 230 can use historical user data to determine the additional location information, as described further herein.

In some implementations, after receiving the request, navigation platform 230 can obtain weather information. For example, navigation platform 230 can obtain weather information using one or more of the techniques described above (e.g., a querying technique, a data mining technique, etc.). In this case, navigation platform 230 can obtain weather information in real-time (e.g., relative to receiving the request), and can use the weather information as a factor in selecting an entrance, of the multiple entrances, as described herein.

In this way, navigation platform 230 can receive a request for a set of navigational directions to a location with multiple entrances.

As further shown in FIG. 4, process 400 can include selecting an entrance, of the multiple entrances, by analyzing information included in the request (block 440). For example, navigation platform 230 can select an entrance, of the multiple entrances, by analyzing the current location of user device 210, geographic map metadata associated with the particular location, the one or more user preferences, the additional metadata, and/or the like.

In some implementations, navigation platform 230 can select an entrance based on a current location of user device 210. In this case, navigation platform 230 can select an entrance that is closest to the current location of user device 210.

Additionally, or alternatively, navigation platform 230 can select an entrance based on the one or more user preferences. For example, the one or more user preferences can include a routing preference, a parking preference, a safety preference, and/or the like, and the navigation platform 230 can analyze the one or more preferences to identify a preferred entrance. In some cases, navigation platform 230 can weight one or more user preferences when selecting an entrance.

Additionally, or alternatively, navigation platform 230 can select an entrance based on additional location information included in the request. In this case, if the user selects a particular geographic location or particular destination within the location (e.g., a store within a mall, a terminal within an airport, etc.), then navigation platform 230 can select an entrance that is nearest to the particular geographic location or nearest to the particular destination.

Additionally, or alternatively, navigation platform 230 can select an entrance based on the additional metadata included in the request. For example, navigation platform 230 can analyze parking information to identify available parking spaces near each entrance, and can select an entrance that has the most available parking spaces. As another example, navigation platform 230 can analyze weather information to identify a current weather forecast, and can select a particular entrance based on the weather information. As a particular example, navigation platform 230 can identify that a current weather forecast includes rain, and can select an entrance that is associated with an underground parking garage.

In some implementations, navigation platform 230 can select an entrance based on a ranking technique. For example, navigation platform 230 can execute a ranking technique that considers one or more ranking factors to rank entrances. The one or more ranking factors can include the current location of user device 210, the one or more user preferences, the additional location information included in the request, the additional metadata (e.g., the parking information, the weather information, etc.), and/or the like. In this case, navigation platform 230 can assign scores to each entrance associated with the location, and can identify and select an entrance with a highest score.

In some implementations, navigation platform 230 can select a default entrance. For example, a particular location can have a default entrance that is most likely to be preferred by user device 210. As an example, a mall can have a primary entrance, and if user device 210 has not provided one or more user preferences, then navigation platform 230 can use the primary entrance as the default entrance associated with the mall.

In some implementations, navigation platform 230 can select an entrance based on historical user preferences. For example, navigation platform 230 can store historical information (e.g., historical user preferences for a group of users), and can select an entrance based on the historical information. In some cases, navigation platform 230 can determine that no user preferences exist in connection with user device 210. Here, navigation platform 230 can analyze historical information to determine that a threshold number of users used a particular entrance, of the multiple entrances, and navigation platform 230 can select the particular entrance.

In some implementations, navigation platform 230 can select an entrance based on a machine learning model. For example, navigation platform 230 can train a machine learning model on historical data of past users. In this case, navigation platform 230 can provide the information included in the request as input to the machine learning model to cause the machine learning model to output a coefficient associated with a particular entrance, of the multiple entrances. In this way, navigation platform 230 can use the machine learning model to select the entrance.

In this way, navigation platform 230 can select an entrance to use as a destination location for the set of navigational directions.

As further shown in FIG. 4, process 400 can include determining the set of navigational directions using information included in the request and/or geographic map metadata associated with the location with the multiple entrances (block 450). For example, navigation platform 230 can use information included in the request and/or geographic map metadata to determine the set of navigational directions to the selected entrance.

In some implementations, navigation platform 230 can determine the set of navigational directions to the selected entrance. For example, navigation platform 230 can execute a routing technique to generate a set of navigational directions to the selected entrance. In some cases, navigation platform 230 can execute a particular routing technique based on a routing preference included in the user preferences (e.g., a routing preference to determine the fastest-available route, the safest route, the most fuel-efficient route, etc.).

In some implementations, navigation platform 230 can determine the set of navigational directions to the selected entrance based on a machine learning model. For example, navigation platform 230 can train a machine learning model on geographic map metadata and/or historical routing information (e.g., information indicating routes taken by prior users). In this case, navigation platform 230 can provide the request for the set of navigational directions as input to the machine learning model to cause the machine learning model to output a coefficient associated with a particular set of navigational directions.

In this way, navigation platform 230 can determine the set of navigational directions using information included in the request and/or geographic map metadata associated with the location with the multiple entrances.

As further shown in FIG. 4, process 400 can include providing the set of navigational directions to the user device to direct the user device to the selected entrance (block 460). For example, navigation platform 230 can provide the set of navigational directions for display on a user interface of user device 210 to direct user device 210 to the selected entrance.

In this way, navigation platform 230 is able to direct user device 210 to the selected entrance.

As further shown in FIG. 4, process 400 can include receiving feedback information from the user device (block 470). For example, a user can interact with user device 210 to provide feedback information relating to the set of navigational directions, and can provide the feedback information to navigation platform 230.

In some implementations, navigation platform 230 can receive feedback information. For example, the feedback information can include positive feedback and/or negative feedback. The positive feedback can indicate that a proper entrance was used for the set of navigational directions. The negative feedback can indicate that an improper entrance was used for the set of navigational directions, and can include free-form text indicating why the selected entrance was improper and/or a preferred entrance to use for subsequent requests for navigational directions. Additionally, or alternatively, the feedback information can indicate that the set of navigational directions did not use a preferred route.

In this way, navigation platform 230 is able to receive feedback information that can be further analyzed to improve navigational directions for user device 210.

As further shown in FIG. 4, process 400 can include performing one or more actions associated with improving navigational directions based on the feedback information (block 480). For example, navigation platform 230 can use the feedback information to modify the data structure, the one or more routing techniques, the one or more user preferences, and/or the like.

In some implementations, navigation platform 230 can modify the data structure. For example, assume the data structure marks a particular entrance for a location as a default entrance, and that the default entrance is the selected entrance used to determine the set of navigational directions. Further assume navigation platform 230 receives feedback information indicating that the selected entrance is not an entrance preferred by the user. In this case, navigation platform 230 can modify the data structure such that a different entrance is used as the default entrance for the user. Additionally, or alternatively, if a threshold amount of users provide similar feedback, then navigation platform 230 can update the data structure such that the different entrance for the location is modified for all users.

In some implementations, navigation platform 230 can modify one or more routing techniques. For example, the feedback information can indicate that a proper entrance was selected but that the route taken was not the proper route. In this case, navigation platform 230 can provide the feedback information to a software developer who can modify code to adjust the routing technique. In some implementations, navigation platform 230 can automatically modify the routing technique.

In some implementations, navigation platform 230 can modify one or more user preferences. For example, the feedback information can indicate that an entrance is not a preferred entrance, or that a route taken is not a preferred route. In this case, navigation platform 230 can modify the one or more user preferences, such that subsequent requests for navigational directions for user device 210 select the preferred entrance, or the preferred route.

In this way, navigation platform 230 is able to perform one or more actions associated with improving navigational directions.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

In this way, navigation platform 230 provides user device 210 with navigational directions to a preferred entrance, even if the location has multiple entrances. Furthermore, navigation platform 230 conserves processing resources and/or network resources that might otherwise be used to re-compute navigational directions for user device 210. For example, if navigation platform 230 determines a set of navigational directions without the methods described herein, user device 210 might be routed to a non-preferred entrance, which might cause user device 210 to re-request navigational directions in hopes of being routed to a preferred entrance.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
obtain geographic map metadata associated with a set of locations having multiple entrances,
the geographic map metadata for each location, of the set of locations, including:
metadata identifying a location, and
metadata identifying multiple entrances associated with the location;
generate a data structure that associates the metadata identifying the location and the metadata identifying the multiple entrances associated with the location for each location, of the set of locations;
receive, from a user device, a request for a set of navigational directions to a first location with multiple entrances,
the first location being one of the set of locations,
the request including:
information identifying the first location with the multiple entrances,
information identifying a current location of the user device, and
information indicating one or more user preferences, the one or more user preferences including at least one of:
a routing preference,
a parking preference, or
a safety preference; and
select an entrance, of the multiple entrances associated with the first location, based on the request and the one or more user preferences,
the entrance being selected using information in the data structure that is associated with the first location;
determine the set of navigational directions using geographic map metadata associated with the first location,
where the selected entrance is used as a destination location for the set of navigational directions; and
provide the set of navigational directions to the user device to direct the user device to the destination location.

2. The device of claim 1, where the one or more processors are further to:
obtain, after obtaining the geographic map metadata, parking information for the first location; and
where the one or more processors, when selecting the entrance, of the multiple entrances associated with the first location, are to:
select the entrance based on the parking information for the first location.

3. The device of claim 1, where the one or more processors, when selecting the entrance, of the multiple entrances associated with the first location, are to:
determine that no user preferences exist in connection with the user device,
analyze historical information to determine that a threshold number of users used a particular entrance, of the multiple entrances, and
select the particular entrance.

4. The device of claim 1, where the one or more processors, when selecting the entrance, of the multiple entrances associated with the first location, are to:
execute a ranking technique to score each entrance, of the multiple entrances associated with the first location,
the ranking technique to score each entrance based on at least one of the following ranking factors:
the information identifying the current location of the user device,
information indicating one or more user preferences,
information from one or more sensors located at the first location, or
additional location information,
identify a first entrance, of the multiple entrances associated with the first location, with a highest score, and
select the first entrance as the entrance.

5. The device of claim 1, where the one or more processors, when determining the set of navigational directions, are to:
provide the geographic map metadata associated with the first location as input to a machine learning model,
the machine learning model to output a coefficient associated with a particular set of navigational directions, and
use the particular set of navigational directions as the set of navigational directions for the user device.

6. The device of claim 1, where the one or more processors are further to:
receive feedback information from the user device,
the feedback information including feedback indicating that the selected entrance is not a preferred entrance;
modify one or more user preferences based on receiving the feedback information;
receive, from the user device and after modifying the one or more user preferences, another request for a set of navigational directions for the first location;
select another entrance based on the modified one or more user preferences;
determine another set of navigational directions that use the other entrance as the destination location; and
provide the other set of navigational directions to the user device to direct the user device to the other entrance that has been selected.

7. The device of claim 6, where the one or more processors are further to:
provide the received feedback information to a machine learning model,
the machine learning model to be updated based at least in part on the received feedback information.

8. The device of claim 1, where the one or more processors are further to:
analyze a data source using a data mining technique, the data mining technique to analyze metadata associated with a heat map to obtain the metadata identifying the multiple entrances associated with the first location.

9. The device of claim 1, where the request further includes additional location information that identifies a set of geographic coordinates within the first location; and
where selecting the entrance, of the multiple entrances associated with the first location, is based at least in part on the additional location information.

10. A non-transitory computer-readable medium storing instructions, the instructions comprising:
one or more instructions that, when executed by one or more processors, cause the one or more processors to:
obtain geographic map metadata associated with a set of locations having multiple entrances,
the geographic map metadata for each location, of the set of locations, including:
metadata identifying a location, and
metadata identifying multiple entrances associated with the location;
generate a data structure that associates the metadata identifying the location and the metadata identifying the multiple entrances associated with the location for each location, of the set of locations;
receive, from a user device, a request for a set of navigational directions to a first location with multiple entrances,
the first location being one of the set of locations,
the request including:
information identifying the first location with the multiple entrances, and
information identifying a current location of the user device;
select an entrance, of the multiple entrances associated with the first location, based on the request,
the entrance being selected using information in the data structure that is associated with the first location,
the entrance being selected after the request is analyzed to determine that there are no related user preferences, and
the entrance being selected as a default entrance, the default entrance being based on historical user preferences of other users;
determine the set of navigational directions using geographic map metadata associated with the first location,
where the selected entrance is used as a destination location for the set of navigational directions; and
provide the set of navigational directions to the user device to direct the user device to the destination location.

11. The non-transitory computer-readable medium of claim 10, where the one or more instructions, that cause the one or more processors to obtain the geographic map metadata, cause the one or more processors to:
analyze a data source using a data mining technique,
the data mining technique to analyze metadata associated with a heat map to obtain the metadata identifying the multiple entrances associated with the first location.

12. The non-transitory computer-readable medium of claim 10, where the one or more instructions, when executed by the one or more processors, further cause the one or more processors to:
obtain parking information for the first location;
where the one or more instructions, that cause the one or more processors to receive the request, cause the one or more processors to:
receive the request,
the request including additional location information,
where the additional location information identifies a set of geographic coordinates within the first location; and
where the one or more instructions, that cause the one or more processors to select the entrance, of the multiple entrances associated with the first location, cause the one or more processors to:
select the entrance based on the parking information and the additional location information.

13. The non-transitory computer-readable medium of claim 10, where the one or more instructions, that cause the one or more processors to select the entrance, of the multiple entrances associated with the first location, cause the one or more processors to:
provide the information included in the request as input to a machine learning model,
the machine learning model to output a coefficient associated with a particular entrance, of the multiple entrances, and
select the particular entrance, as the entrance, based on the coefficient.

14. The non-transitory computer-readable medium of claim 10, where the one or more instructions, when executed by the one or more processors, further cause the one or more processors to:
receive, after providing the set of navigational directions to the user device, feedback information from the user device,
the feedback information including feedback indicating that the set of navigational directions is not a preferred set of navigational directions;
modify one or more routing techniques based on receiving the feedback information;
receive, from the user device, another request for a set of navigational directions for the first location;
select the entrance by analyzing the information included in the other request;
determine another set of navigational directions that use the entrance as the destination location,
the other set of navigational directions being based on the one or more modified routing techniques; and
provide the other set of navigational directions to the user device to direct the user device to the selected entrance.

15. A method, comprising:
obtaining, by a device, geographic map metadata associated with a set of locations having multiple entrances,
the geographic map metadata for each location, of the set of locations, including:
metadata identifying a location, and
metadata identifying multiple entrances associated with the location;
generating, by the device, a data structure that associates the metadata identifying the location and the metadata identifying the multiple entrances associated with the location for each location, of the set of locations;
receiving, by the device and from a user device, a request for a set of navigational directions to a first location with multiple entrances,
the first location being one of the set of locations,
the request including:

information identifying the first location with the multiple entrances, and
information identifying a current location of the user device;

obtaining parking information for the first location;

selecting, by the device, an entrance, of the multiple entrances associated with the first location, based on the request and based on the parking information for the first location,
the entrance being selected using information in the data structure that is associated with the first location;

determining, by the device, the set of navigational directions using geographic map metadata associated with the first location,
where the selected entrance is used as a destination location for the set of navigational directions; and providing, by the device, the set of navigational directions to the user device to direct the user device to the destination location.

16. The method of claim 15, where receiving the request comprises:
receiving the request,
the request including additional location information,
where the additional location information identifies a set of geographic coordinates within the first location; and
where selecting the entrance, of the multiple entrances associated with the first location, comprises:
selecting the entrance based on the additional location information.

17. The method of claim 15, where selecting the entrance, of the multiple entrances associated with the first location, comprises:
executing a ranking technique to score each entrance, of the multiple entrances associated with the first location,
identifying a first entrance, of the multiple entrances, where the first entrance has a highest score, and
selecting the first entrance as the entrance.

18. The method of claim 15, where selecting the entrance, of the multiple entrances associated with the first location, comprises:
providing the information included in the request as input to a machine learning model,
the machine learning model to output a coefficient associated with a particular entrance, of the multiple entrances, and
selecting the particular entrance, as the entrance, based on the coefficient.

19. The method of claim 15, where determining the set of navigational directions comprises:
determining the set of navigational directions using a routing technique and a routing preference included in one or more user preferences,
where the routing preference is:
a preference for a fuel-efficient route,
a preference for a fastest-available route, or
a preference for a safest route.

20. The method of claim 15, further comprising:
receiving, after providing the set of navigational directions to the user device, feedback information from the user device;
modifying, based on receiving the feedback information, at least one of:
a user preference, of one or more user preferences, or
a routing technique; and
processing another request for a set of navigational directions using at least one of the user preference that has been modified or the routing technique that has been modified.

* * * * *